(12) United States Patent
Heilig et al.

(10) Patent No.: US 7,051,969 B2
(45) Date of Patent: May 30, 2006

(54) BELT RETRACTOR

(75) Inventors: Alexander Heilig, Wissgoldingen (DE); Martin Prokscha, Schwäbisch Gmünd (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 22 days.

(21) Appl. No.: 10/679,570

(22) Filed: Oct. 6, 2003

(65) Prior Publication Data

US 2004/0069890 A1 Apr. 15, 2004

(30) Foreign Application Priority Data

Oct. 15, 2002 (DE) ............................ 202 15 835 U

(51) Int. Cl.
*B65H 75/48* (2006.01)

(52) U.S. Cl. ..................... 242/382.5; 242/383; 242/384

(58) Field of Classification Search ............. 242/384.2, 242/383.4, 384, 384.4–384.6, 382, 382.5, 242/383

See application file for complete search history.

(56) References Cited

U.S. PATENT DOCUMENTS

| | | | | |
|---|---|---|---|---|
| 3,834,646 A | * | 9/1974 | Heath | 242/385.3 |
| 3,868,068 A | * | 2/1975 | Heath | 242/384.2 |
| 4,058,271 A | * | 11/1977 | Ubukata et al. | 242/383.4 |
| 4,141,518 A | * | 2/1979 | Yamanashi | 242/383.4 |
| 4,483,495 A | * | 11/1984 | Honl | 242/384.2 |
| 4,506,844 A | * | 3/1985 | Ernst | 242/376.1 |
| 4,522,350 A | | 6/1985 | Ernst | |
| 5,033,691 A | | 7/1991 | Tada et al. | |
| 6,527,214 B1 | * | 3/2003 | Sumiyashiki | 242/383.2 |

FOREIGN PATENT DOCUMENTS

| | | |
|---|---|---|
| DE | 3908666 | 10/1989 |
| DE | 4309586 | 9/1993 |
| DE | 4232237 | 3/1994 |

(Continued)

*Primary Examiner*—Kathy Matecki
*Assistant Examiner*—Sang Kim
(74) *Attorney, Agent, or Firm*—Tarolli, Sundheim, Covell & Tummino LLP

(57) ABSTRACT

A belt retractor for a vehicle safety belt comprises a frame and a belt spool (1) which is rotatably mounted in the frame, and at least one locking toothing (2, 3) which is connected with the belt spool. A first locking catch (5) and a second locking catch (6) are provided, which are supported on the frame and can engage into the at least one locking toothing (2, 3). The first locking catch (5) is able to swing about a point of rotation which is arranged such that with the first locking catch (5) guided into the locking toothing (2, 3) a virtual line, which passes through a point of contact between the first locking catch (5) and the locking toothing (2, 3) and stands perpendicularly on a tooth face in the point of contact, runs between the point of rotation and a rotation axis of the belt spool (1). The second locking catch (6) is able to swing about a point of rotation which is arranged such that with the second locking catch (6) guided into the locking toothing (2, 3), a virtual line which passes through a point of contact between the second locking catch (6) and the locking toothing (2, 3) and stands perpendicularly on a tooth face in the point of contact, runs on the side of the point of rotation facing away from the rotation axis of the belt spool (1).

11 Claims, 3 Drawing Sheets

FOREIGN PATENT DOCUMENTS

| | | |
|---|---|---|
| DE | 19648084 | 5/1998 |
| DE | 4311201 | 6/2000 |
| DE | 20004674 | 9/2000 |
| DE | 19780583 | 1/2001 |
| DE | 20112656 | 2/2002 |
| DE | 69712554 | 1/2003 |
| GB | 2070913 A * | 9/1981 |
| WO | WO89/08570 | 9/1989 |

* cited by examiner

BELT RETRACTOR

TECHNICAL FIELD

The invention relates to a belt retractor for a vehicle safety belt.

BACKGROUND OF THE INVENTION

A conventional belt retractor normally has a frame and a belt spool which is rotatably mounted in the frame, and at least one locking toothing which is connected with the belt spool.

To block the belt spool against a rotation in the belt band unwinding direction, usually a locking system is provided, which has a locking catch supported on the frame, and a locking toothing connected with the belt spool. The locking catch can be guided by an automatic blocking arrangement into the locking toothing in a vehicle-sensitive and/or belt band-sensitive manner, so that the belt spool is blocked.

In order to ensure that the locking catch also remains engaged securely in the locking toothing in the case of high stresses, usually it is ensured through the geometry of the locking catch and/or of the locking toothing, that the forces exerted by the locking toothing onto the locking catch exert a torque onto the locking catch, urging the locking catch towards the locking toothing. However, the result of this is that the locking catch can only be moved out from the locking toothing again when the locking toothing and therefore the belt spool carry out a specific reverse rotation in the belt band winding direction. Otherwise, the friction forces between the locking catch and the locking toothing could not be overcome.

The object of the invention consists in providing a belt retractor of the type initially mentioned, in which owing to structurally simple steps on the one hand a secure blocking of the belt spool and, on the other hand, a simple unlocking of the locking toothing can be achieved.

BRIEF SUMMARY OF THE INVENTION

According to the invention, a belt retractor for a vehicle safety belt comprises a frame and a belt spool which is rotatably mounted in the frame, and at least one locking toothing which is connected with the belt spool. A first locking catch and a second locking catch are provided, which are supported on the frame and can engage into the at least one locking toothing. The first locking catch is able to swing about a point of rotation which is arranged such that with the first locking catch guided into the locking toothing a virtual line, which passes through a point of contact between the first locking catch and the locking toothing and stands perpendicularly on a tooth face in the point of contact, runs between the point of rotation and a rotation axis of the belt spool. The second locking catch is able to swing about a point of rotation which is arranged such that with the second locking catch guided into the locking toothing, a virtual line which passes through a point of contact between the second locking catch and the locking toothing and stands perpendicularly on a tooth face in the point of contact, runs on the side of the point of rotation facing away from the rotation axis of the belt spool.

In this way, the first locking catch is constructed and arranged such that when it is in a state guided into the locking toothing, a torque acts on it which urges it away from the locking toothing or which in a borderline case can also become zero. The second locking catch, on the other hand, is constructed and arranged such that when it is in a state guided into the locking toothing, a torque acts on it which urges it into the locking toothing. The invention is based on the basic idea of providing a division of work to the effect that the first locking catch is provided for a normal situation blocking of the belt spool and the second locking catch is provided for a crash situation blocking of the belt spool. The term "normal situation blocking" is understood here to mean a blocking, such as occurs in the normal operation of the vehicle, for example on sharp braking, on driving round a bend, etc. The term "crash situation blocking", on the other hand, is understood to mean a blocking which in the case of a vehicle accident serves to hold back the vehicle occupant. The operating blocking and the crash situation blocking therefore differ on the one hand by the forces which are in action and on the other hand by the frequency of occurrence: The forces occurring during normal operation blocking in the belt band lie at a maximum in the order of magnitude of the weight of the vehicle occupant, whereas in crash situation blocking the force in the belt band is a multiple of the weight of the vehicle occupant. The normal situation blocking can occur several thousand times during the life of a belt retractor, whereas the crash situation blocking usually only occurs on one single occasion; then the belt retractor should be replaced by a new one. The first locking catch, which is used for the normal situation blocking, is distinguished in that it can be easily withdrawn from the locking toothing, because it is in any case pressed out from the locking toothing by the torque acting on it, or in that the acting torque is equal to zero in a borderline case, when the effective lever arm between the point of rotation of the catch and its point of contact with the locking toothing becomes zero. Therefore, no reverse rotation of the belt spool is necessary in order to disengage the locking catch and to free the belt spool again.

Of course, the first locking catch can only be stressed up to a certain level, because otherwise the acting torque can not be taken up by the blocking mechanism—which guides the first locking catch into the locking toothing—and the locking catch would be forced out from the locking toothing. Above this level, the second locking catch becomes effective. Because the torque affecting the second locking catch urges it into the locking toothing, the hold of the second locking catch in the locking toothing improves with increasing stress on its own. The fact that the second locking catch can only be released from the second locking toothing after a reverse rotation of the belt spool is of minor importance in practice.

In an embodiment according to the invention, the first locking catch can be constructed so as to be flexible, so that with a torque acting on it above the level of the normal situation blocking, it loses its locking effect, e.g. by bending or breaking along a predetermined breaking point, whereby the second locking catch comes into engagement into the locking toothing. For this, the locking catches in each case can be constructed as separate elements or as one element in the form of a tandem catch, in which the first locking catch is constructed as an additional edge alongside the second locking catch.

In a further embodiment according to the invention, a belt retractor of the type initially mentioned is constructed such that first locking toothing and second locking toothing are provided, which are each connected with the belt spool. This makes it possible for the two locking catches to use respectively adapted locking toothings.

According to an embodiment of the invention, provision is made that the teeth of the first locking toothing are constructed without undercut, and the teeth of the second locking toothing are constructed with undercut. The locking toothing without undercut is biased against the locking toothing with undercut by means of a spring and precedes it through the spring action. The teeth of the first locking catch are likewise constructed without undercut, whereas the teeth of the second locking catch are constructed with undercut. In the case of a locking process with the locking catches engaging, firstly the locking catch without undercut comes into engagement into the locking toothing without undercut, in order to carry out a normal situation blocking. In this case, an unlocking of the locking catch is possible without a reverse rotation of the belt spool, and can take place almost without any expenditure of force with the spring rendered powerless. After exceeding a threshold force acting through the belt onto the belt spool, which results from the spring parameters, the locking toothing with undercut rotate further against the spring force, so that the locking catch with undercut comes into engagement into it. With an engagement of the locking catch with undercut into the locking toothing with undercut, through the rotation of the belt spool an entraining moment is produced, which brings about a complete swiveling of the locking catch and therefore ensures a secure and rapid engagement which can transfer without difficulty the high forces which occur in a crash situation blocking.

In a further embodiment, the swivel axis of the first locking catch, which is provided for the normal situation blocking, can be arranged such that the effective lever arm between the point of rotation and the point of contact between the locking catch and the locking toothing, with the locking catch guided into the locking toothing, becomes completely or at least almost zero, whereby the torque acting on the locking catch likewise becomes zero. In this way, with a blocking of the belt spool, the catch is not forced out from the locking toothing and can be held more easily in the blocking position by the blocking mechanism.

The first locking catch can be produced at a favorable cost from plastic or from another flexible material, because it does not have to be dimensioned for breaking load.

DETAILED DESCRIPTION OF THE PREFERRED EMBODIMENTS

Figure 1:
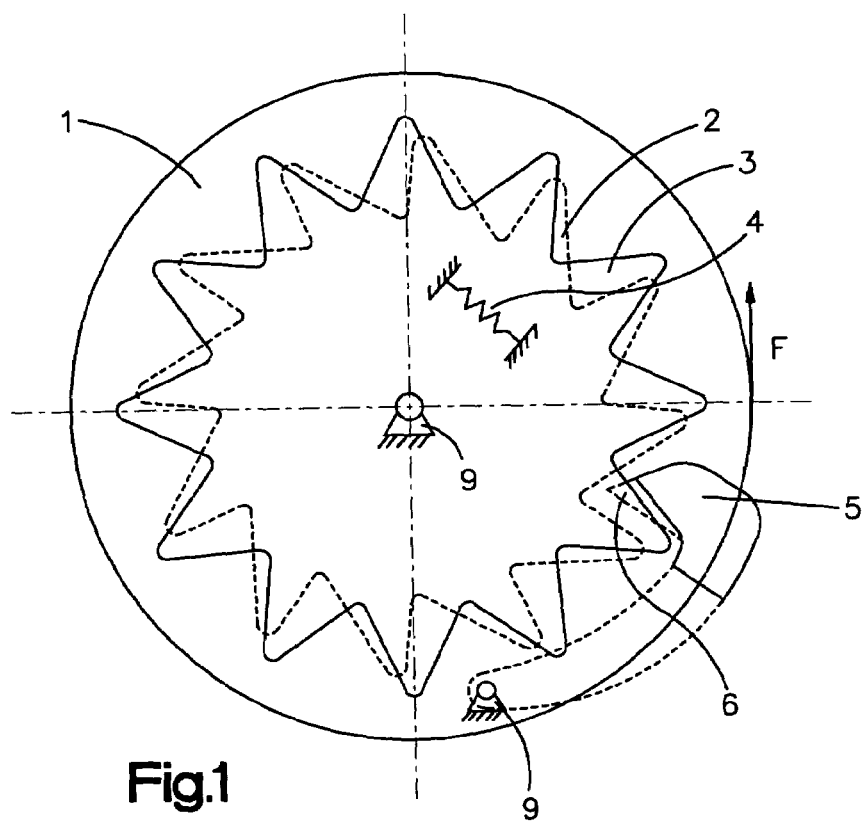
FIG. 1 shows in a diagrammatic side view a belt retractor with guided-in locking catches, in an embodiment according to the invention with a locking toothing without undercut and a locking toothing with undercut.

FIG. 1 shows a belt retractor according to the invention for a vehicle safety belt. It consists substantially of a belt spool 1, rotatably mounted on a frame 9, on which a belt force F engages and which is firmly connected with a locking toothing 2 having an undercut. The locking toothing 3 without undercut is biased against the locking toothing 2 by means of a spring 4. Through the spring action, the locking toothing 3 without undercut precedes the locking toothing 2 with undercut in the direction of the force F acting on the belt spool in a locking process. In FIG. 1, two pivotally mounted locking catches 5, 6 are shown in guided-in position, the second locking catch 6 of which has an undercut and the first locking catch 5 does not. The locking catches 5, 6 are supported on the frame 9. The locking catches 5, 6 will be swiveled into the locking toothing 2, 3 after the triggering of the locking process. For an unlocking of the locking system, the locking catches 5, 6 are swiveled outwards again. The process of swiveling in and out can be realized in a known manner and is not the subject of the invention.

Figure 2:
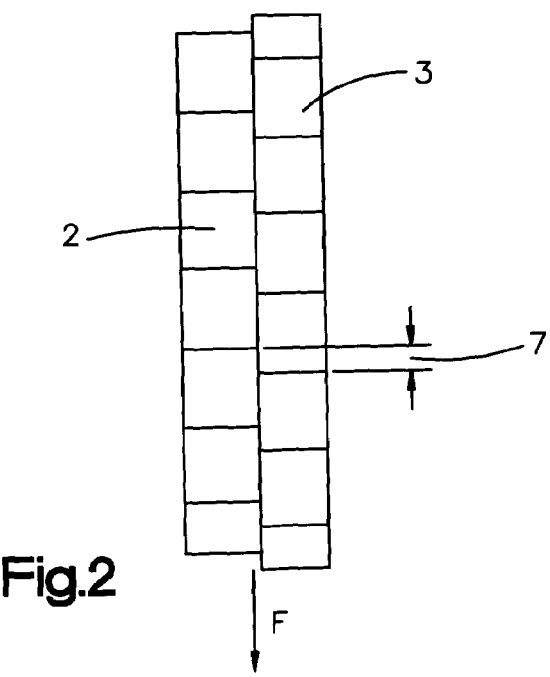
FIG. 2 shows in a diagrammatic top view the locking toothing of the belt retractor according to the invention, shown in FIG. 1.

In FIG. 2, there is shown the relative position of the locking toothing 2, 3 with respect to each other of a belt retractor according to the invention. The locking toothing 3 without undercut precedes the locking toothing 2 with undercut by a spring course 7, which is determined by the staggering of the locking toothings with respect to each other. Through this preceding, in a locking process in which the locking catches 5, 6 swivel into the locking toothings 2, 3, firstly the catch 5 without undercut arrives into engagement into the locking toothing 3 and blocks it. If the belt force F engaging on the belt spool now exceeds a particular threshold value $F_{threshold}$, then the belt spool 1 with the locking toothing 2 with undercut, firmly connected therewith, rotates further against the action of the elastic force in the spring 4, so that the catch 6 with undercut now also can come into engagement into the locking toothing 2 with undercut.

Figure 3:
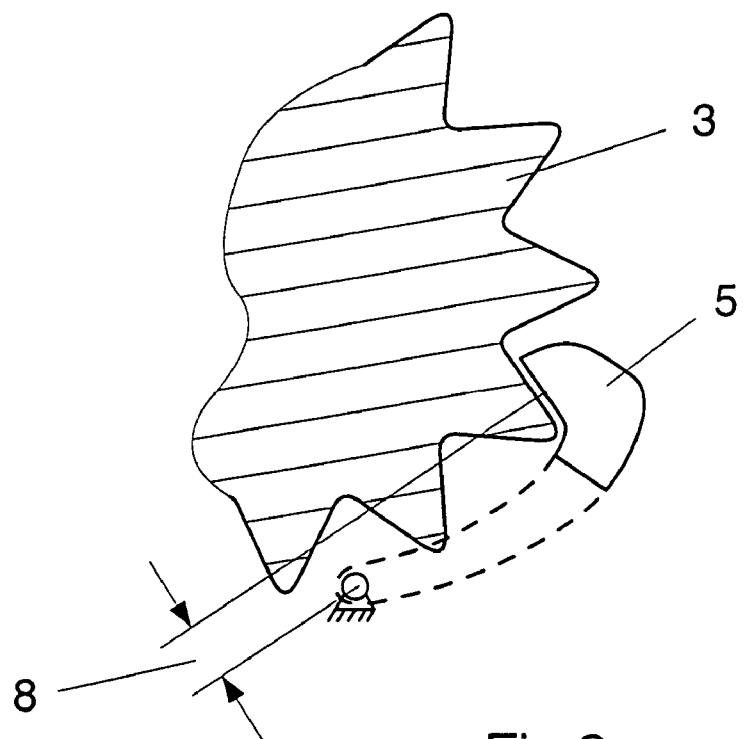
FIG. 3 shows in a diagrammatic broken side view the locking toothing without undercut with guided-in locking catch without undercut, of the belt retractor according to the invention, shown in FIG. 1.

FIG. 3 shows the locking catch 5 without undercut of a belt retractor according to the invention, being in engagement in the locking toothing 3 without undercut. If, after the triggering of a locking process and the swiveling-in of the locking catch 5, the belt force F does not exceed the threshold value $F_{threshold}$, and if therefore an engagement of the locking catch 6 with undercut into the locking toothing 2 does not occur, then an unlocking of the system, i.e. a swiveling out of the locking catch 5 is possible without a reverse rotation of the belt spool 1, because no entraining moment acts onto the locking catch 5 via the lever arm 8. If the spring 4 is now rendered powerless, then the swiveling out of the catch 5 is also possible in an almost powerless manner. In this way, the unlocking process can be greatly simplified.

Figure 4:
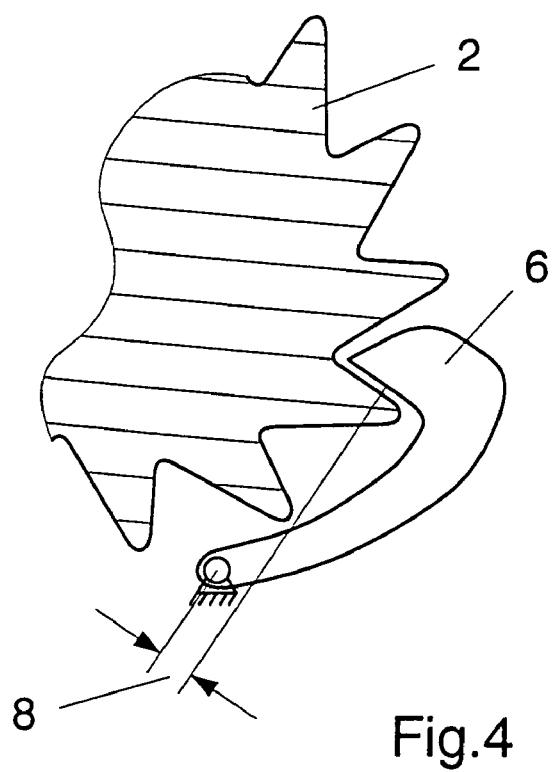
FIG. 4 shows in a diagrammatic broken side view the locking toothing with undercut with guided-in locking catch with undercut, of the belt retractor according to the invention shown, in FIG. 1.

FIG. 4 shows the locking catch 6 with undercut, of a belt retractor according to the invention, in engagement in the locking toothing 2 with undercut. In this case, through the belt force F, which now exceeds $F_{threshold}$, an entraining moment acts via the lever arm 8 onto the locking catch 6 with undercut, whereby a faster and complete gripping of the catch is brought about and the breaking load in the case of a crash can be reliably transferred.

Figure 5:
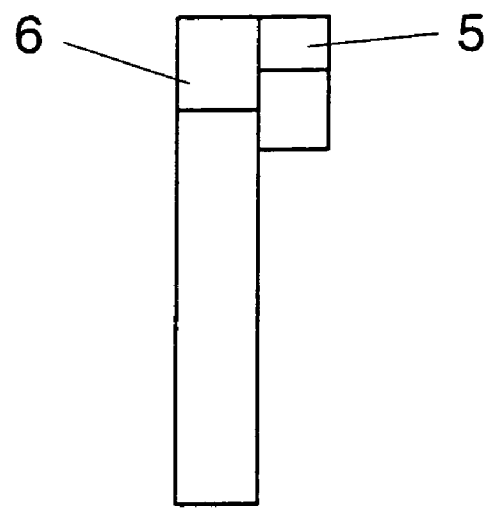
FIG. 5 shows in a diagrammatic top view the locking catches of a belt retractor according to the invention in an embodiment in which both locking catches are constructed as separate elements.

In FIG. 5, the first locking catch 5 and the second locking catch 6 of a belt retractor according to the invention in accordance with a first embodiment, are shown as two separate catches. This embodiment has the advantage that the first locking catch 5 can be produced at a favorable cost from plastic, because it does not have to be dimensioned to breaking load.

Figure 6:
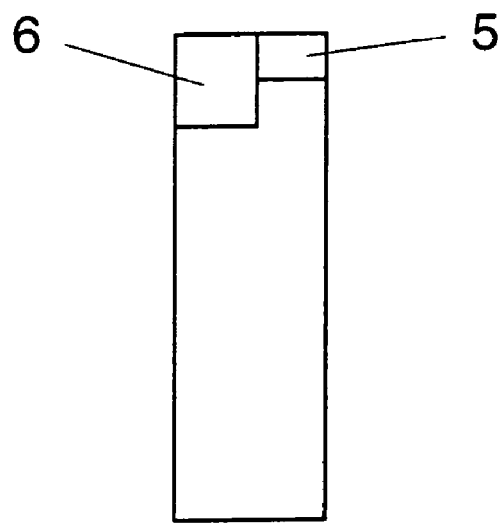
FIG. 6 shows in a diagrammatic top view the locking catches of a belt retractor according to the invention in a further embodiment, in which the locking catches are constructed as one element in the form of a tandem catch and the first locking catch is constructed as an additional edge alongside the second locking catch.

FIG. 6 shows the first locking catch 5 and the second locking catch 6 of a belt retractor according to the invention in accordance with a further embodiment. Here, the two catches 5, 6 form a tandem catch, the first locking catch 5 being constructed as an additional edge alongside the second locking catch 6.

The invention claimed is:

1. A belt retractor for a vehicle safety belt, said belt retractor comprising a frame (9) and a belt spool (1) which is rotatably mounted in said frame (9), a first locking toothing (3) and a second locking toothing (2) which are connected with said belt spool; a first locking catch (5) and a second locking catch (6) being provided, which are supported on said frame (9) and engage into each of said locking toothings (2, 3) respectively to respectively lock rotation of said belt spool; said first locking catch (5) being able to swing about a point of rotation which is arranged such that with said first locking catch (5) guided into said first locking toothing (3), a virtual line which passes through a point of contact between said first locking catch (5) and said first locking toothing (3) extends perpendicularly to a tooth face in said point of contact, and runs between said point of rotation and a rotation axis of said belt spool (1); and said second locking catch (6) being able to swing about a point of rotation which is arranged such that with said second locking catch (6) guided into said second locking toothing (2), a virtual line which passes through a point of contact between said second locking catch (6) and said second locking toothing (2) extends perpendicularly to a tooth face at said point of contact, and runs on the side of said point of rotation facing away from said rotation axis of said belt spool (1).

2. The belt retractor according to claim 1, characterized in that, said first locking catch (5) when guided in engages into said first locking toothing (3) and said second locking catch (6) when guided in engages into a nonlocking position spaced apart from said tooth face of said first locking toothing (3).

3. The belt retractor according to claim 2, characterized in that said first locking catch (5) is constructed so as to be flexible.

4. The belt retractor according to claim 3, characterized in that said first locking catch (5) is constructed as an additional part on said second (6) locking catch, which is connected with said second locking catch (6) by a predetermined breaking point.

5. The belt retractor according to claim 1, characterized in that said first locking toothing (3) and said second locking toothing (2) are provided, which each are connected with said belt spool, said first locking catch (5) being able to engage into said first locking toothing (3) and said second locking catch (6) being able to engage into said second locking toothing (2).

6. The belt retractor according to claim 5, characterized in that teeth of said first locking toothing (3) are constructed without undercut and teeth of said second locking toothing (2) are constructed with undercut.

7. The belt retractor according to claim 5, characterized in that said first locking toothing (3) is arranged on a locking disk which is rotatable relative to said second locking toothing (2), and that a spring (4) is provided, which urges said locking disk relative to said second locking toothing (2) into an initial position in which it precedes said second locking toothing (2).

8. The belt retractor according to claim 1, characterized in that teeth of said first, locking catch (5) are constructed without undercut and teeth of said second locking catch (6) are constructed with undercut.

9. The belt retractor according to claim 1, characterized in that with said locking catch (5) guided into said locking toothing (3), a virtual line which passes through said point of contact between said locking catch (5) and said locking toothing (3) and stands perpendicularly on said tooth face in said point of contact, runs right through said point of rotation of said locking catch (5).

10. The belt retractor according to claim 1, characterized in that said first locking catch is produced from a flexible material.

11. A belt retractor for a vehicle safety belt, said belt retractor comprising a frame (9) and a belt spool (1) which is rotatably mounted in said frame (9), and a locking disc (3) which comprises an array of circumferentially spaced locking teeth connected with said belt spool, a first locking catch (5) which is supported on said frame (9) and which engages into said locking disc (3) to lock rotation of said belt spool, said first locking catch (5) being able to swing about a point of rotation which is arranged such that with said first locking catch (5) guided into said locking disc (3), a virtual line, which passes through a point of contact between said first locking catch (5) and said locking disc (3) extends perpendicularly to a tooth face at said point of contact, and said virtual line lies between said point of rotation and a rotation axis of said belt spool (1), a second locking catch (6) which is supported on said frame (9) and which engages into said locking disc (3) to lock rotation of said belt spool, said second locking catch (6) being able to swing about a point of rotation which is arranged such that with said second locking catch (6) guided into said locking disc (3), a virtual line which passes through a point of contact between said second locking catch (6) and said locking disc (3) extends perpendicularly to a tooth face at said point of contact, and lies and runs on the side of said point of rotation facing away from said rotation axis of said belt spool (1).

* * * * *